(12) United States Patent
Kobayashi

(10) Patent No.: US 11,035,452 B2
(45) Date of Patent: Jun. 15, 2021

(54) WAVE GENERATOR AND STRAIN WAVE GEARING

(71) Applicant: HARMONIC DRIVE SYSTEMS INC., Tokyo (JP)

(72) Inventor: Masaru Kobayashi, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 440 days.

(21) Appl. No.: 16/305,598

(22) PCT Filed: Jul. 30, 2016

(86) PCT No.: PCT/JP2016/072457
§ 371 (c)(1),
(2) Date: Nov. 29, 2018

(87) PCT Pub. No.: WO2018/025297
PCT Pub. Date: Feb. 8, 2018

(65) Prior Publication Data
US 2020/0284332 A1    Sep. 10, 2020

(51) Int. Cl.
*F16H 49/00* (2006.01)
*F16C 33/34* (2006.01)
(Continued)

(52) U.S. Cl.
CPC .......... *F16H 49/001* (2013.01); *F16C 33/34* (2013.01); *F16C 2361/61* (2013.01); *F16H 1/32* (2013.01);
(Continued)

(58) Field of Classification Search
CPC ............................... F16H 49/001; F16C 33/34
(Continued)

(56) References Cited

U.S. PATENT DOCUMENTS 7,694,607 B2 *  4/2010  Ishikawa ............. F16H 55/0833
                                                    74/640
7,735,396 B2 *  6/2010  Ishikawa ............. F16H 55/0833
                                                    74/640
(Continued)

FOREIGN PATENT DOCUMENTS

DE        10149833 A1    4/2003
DE    102006057874 A1    6/2008
(Continued)

OTHER PUBLICATIONS

International Search Report (PCT/ISA/210) dated Sep. 20, 2016, by the Japanese Patent Office as the International Searching Authority for International Application No. PCT/JP2016/072457.
(Continued)

*Primary Examiner* — Ha Dinh Ho
(74) *Attorney, Agent, or Firm* — Buchanan Ingersoll & Rooney PC

(57) ABSTRACT

A wave bearing of a wave generator of a strain wave gearing is provided with steel or stainless steel cylindrical hollow rollers between an inner-race-side raceway surface and an outer-race-side raceway surface, the hollow rollers serving as rolling elements. The ratio Di/Do of the inner diameter Di to the outer diameter Do of the hollow rollers is set to 0.95 or more. The relative radius of curvature of hollow rollers that have been flexed into an ellipsoidal shape increases with respect to the inner-race raceway surface and the outer-race raceway surface with which the hollow rollers are in contact, and the Hertz maximum contact stress is reduced. The hardness of the hollow rollers, the inner-race raceway surface, and the outer-race raceway surface can be reduced.

6 Claims, 4 Drawing Sheets

(51) Int. Cl.
*F16H 1/32* (2006.01)
*F16H 55/08* (2006.01)

(52) U.S. Cl.
CPC .... *F16H 55/0833* (2013.01); *F16H 2049/003* (2013.01)

(58) Field of Classification Search
USPC .......................................................... 74/640
See application file for complete search history.

(56) References Cited

U.S. PATENT DOCUMENTS

| | | | |
|---|---|---|---|
| 9,435,418 B2* | 9/2016 | Hoshina | F16C 19/44 |
| 2002/0174741 A1 | 11/2002 | Kobayashi | |
| 2007/0157760 A1* | 7/2007 | Kiyosawa | F16C 39/02 |
| | | | 74/640 |
| 2008/0173130 A1* | 7/2008 | Zhang | F16H 49/001 |
| | | | 74/640 |

FOREIGN PATENT DOCUMENTS

| | | |
|---|---|---|
| JP | 2002250344 A | 9/2002 |
| JP | 2002349645 A | 12/2002 |
| JP | 2004308755 A | 11/2004 |
| JP | 2006226357 A | 8/2006 |
| JP | 2011190826 A | 9/2011 |
| JP | 3196575 U | 3/2015 |

OTHER PUBLICATIONS

Written Opinion (PCT/ISA/237) dated Sep. 20, 2016, by the Japanese Patent Office as the International Searching Authority for International Application No. PCT/JP216/072457.

* cited by examiner (a)

(b)

WAVE GENERATOR AND STRAIN WAVE GEARING

TECHNICAL FIELD

The present invention relates to a wave generator of a strain wave gearing, and particularly to a wave generator provided with a wave generator having cylindrical hollow rollers that serve as rolling elements.

BACKGROUND ART

There has been known a wave generator of a conventional strain wave gearing, in which a roller bearing is employed as a wave bearing. Such wave generators have been proposed in Patent documents 1 and 2.

Roller bearings provided with hollow rollers have been proposed in Patent documents 3 and 4. In the roller bearing described in patent document 3, the inner diameter Di and the outer diameter Do of hollow rollers of a roller bearing are set to be $1/3 \leq Di/Do \leq 1/2$ to reduce centrifugal force and inertial force that are applied to the roller bearing. In the roller bearing described in patent document 4, the roller average diameter Da and the roller inner diameter dw of hollow rollers are set to be $0.20 \leq dw/Da \leq 0.27$ so that the life span of the bearing is defined by the fatigue flaking on the raceway surface not by the cracking from the inner circumferential surface of rollers.

PRIOR ART DOCUMENTS

Patent Documents

Patent document 1: JP 2011-190826 A
Patent document 2: JPU 3196575 B
Patent document 3: JP 2002-250344 A
Patent document 4: JP 2006-226357 A

SUMMARY OF THE INVENTION

Problems to be Solved by the Invention

In the wave generator of a conventional strain wave gearing, cylindrical rollers of the wave bearing are of solid type (columnar shape) and are manufactured from high hardness steel. It is, therefore, also necessary to use high hardness steel having a high yield stress for the raceway-surface portions of the inner and outer races on which the cylindrical rollers roll.

The ellipsoidal outer circumferential surface of a wave plug of a wave generator is used as the inner-race-side raceway surface to omit an inner race in patent document 1. The ellipsoidal outer circumferential surface of a wave plug is used as an inner-race-side raceway surface and the inner circumferential surface of a flexible externally toothed gear is used as an outer-race-side raceway surface so that inner and outer races are omitted in patent document 2. In this case, it is not possible for the yield stress of the rigid plug and the externally toothed gear to bear a radial load acting on the wave bearing caused by the load torque of a strain wave gearing, and the load torque must be limited. Alternatively, the hardness of the raceway surface portions must be increased to withstand the radial load.

Focusing on a roller bearing provided with hollow rollers, an object of the present invention is to provide a wave generator of a strain wave gearing, in which there is no need to increase the hardness of the raceway surface portions even if the wave bearing is made of steel or stainless steel.

Means of Solving the Problems

In order to solve the above problems, a wave generator of a strain wave gearing according to the present invention includes:

a rigid wave plug; and a wave bearing between an ellipsoidal outer circumferential surface of the wave plug and an inner circumferential surface of a flexible externally toothed gear which is a component part of the strain wave gearing, the wave bearing including a plurality of rolling elements inserted in a rollable state between an inner-race-side raceway surface and an outer-race-side raceway surface;

the rolling elements being a cylindrical hollow roller made of steel or stainless steel;

a rigidity of the hollow roller in a diameter direction being set so as to establish a state in which the flexible externally toothed gear having a circular shape is flexed into a predetermined ellipsoidal shape by the rigid plug; and a lower limit value of a ratio Di/Do of an inner diameter Di to an outer diameter Do of the hollow roller being 0.95.

The wave bearing of the wave generator has hollow rollers made of steel or stainless steel. The wave bearing is subjected to a radial load due to a load torque of the strain wave gearing. The cylindrical hollow rollers, which are located on both end portions in the major-diameter direction of the ellipsoidal outer circumferential surface of the rigid plug, are flexed and deformed into an ellipsoidal shape by the radial load.

The hollow rollers that have been flexed in an ellipsoidal shape have an increased relative radius of curvature with respect to the inner-race-side raceway surface or the outer-race-side raceway surface with which the hollow rollers are in contact. This can reduce the Hertz maximum contact stress. The Hertz stress is thus reduced, and according to the degree of reduction, the hardness of the hollow rollers, the inner-race-side raceway surface portion, and the outer-race-side raceway surface portion can be reduced, respectively. The fatigue life of the hollow rollers can also be enhanced by making use of the hoop stress that is generated when the hollow rollers are flexed into an ellipsoidal shape.

The upper limit value of the ratio Di/Do of the inner diameter Di to the outer diameter Do is restricted by the following factors. First, when the ratio is made to increase, the thickness of the hollow rollers becomes thin and the rigidity in the diameter direction thereof is decreased. It is necessary in a strain wave gearing to flex the flexible externally toothed gear into a prescribed ellipsoidal shape and mesh with the rigid internally toothed gear in an appropriate manner. The rigidity of the hollow rollers is therefore predetermined so as to establish a state in which the externally toothed gear having a circular shape is flexed into an ellipsoidal shape having a predetermined major diameter. In order to obtain such rigidity of the hollow rollers, the upper limit value of the ratio Di/Do is restricted.

Second, the upper limit value of the ratio Di/Do is restricted so that the radius of curvature of the minor-diameter portions of the outer circumferential surface of the ellipsoidally-flexed hollow rollers does not exceed the radius of curvature of the major-diameter portions of the ellipsoidally-flexed inner-race-side raceway surface.

Next, the hollow rollers, which have a ratio of Di/Do equal to or larger than 0.95 and a large hollow part, become to have a thin cylindrical shape and reduced area of end faces thereof, and in some cases, it is not able to function as practical roller end faces. Accordingly, it is desirable that the hollow rollers have roller end parts covering the both side openings of the hollow part thereof and that the roller end parts are formed from a material having a lower elastic modulus and lower coefficient of friction than that forming the body of hollow rollers. The end portions of the hollow rollers can be formed from a material, for example, plastics et al. It is also possible to fill the hollow part entirely with a material such as plastics.

MODE FOR CARRYING OUT THE INVENTION

Figure 1:
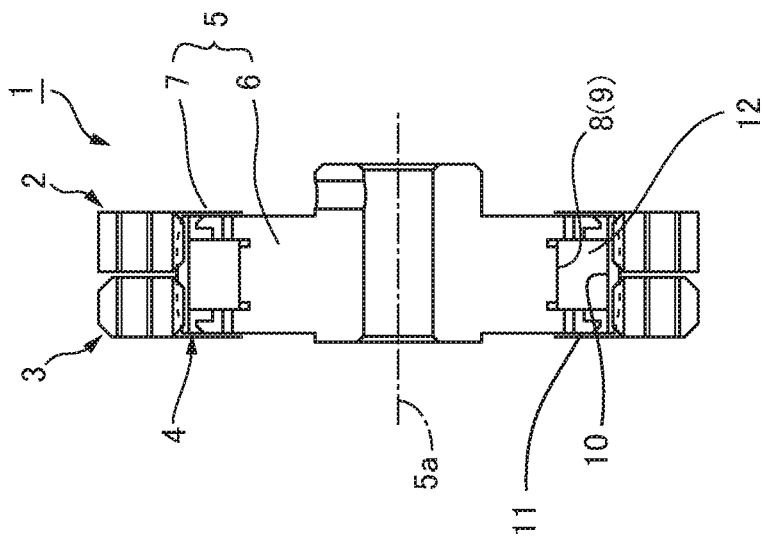
FIG. 1 includes a schematic front view and a schematic longitudinal cross-sectional view, illustrating a strain wave gearing according to the present invention.
Figure 1:
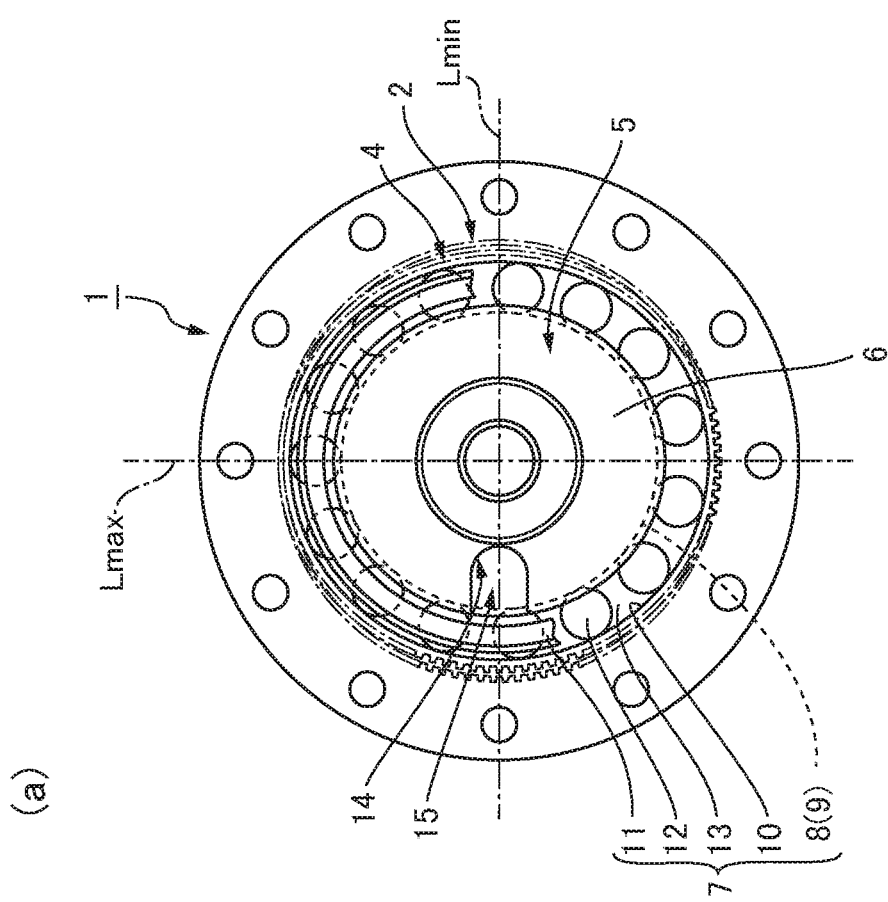

An embodiment of a strain wave gearing according to the present invention will be described with reference to the drawings hereinbelow. FIG. 1(a) is a schematic front view of a strain wave gearing according to the present embodiment, and FIG. 1(b) is a schematic longitudinal cross-sectional view thereof.

The strain wave gearing 1 is provided with a rigid internally toothed gear 2 and a rigid internally toothed gear 3, a cylindrical flexible externally toothed gear 4 disposed inside the internally toothed gears, and a wave generator 5 having an ellipsoidal contour and fitted into the externally toothed gear. The circular externally toothed gear 4 is flexed into an ellipsoidal shape by the wave generator 5. External teeth of the flexible externally toothed gear 4 on both ends in the direction of the major axis Lmax of the ellipsoidal shape mesh with internal teeth of the circular internally toothed gears 3 and 4, respectively. For example, the internally toothed gear 3 and the externally toothed gear 4 have the same number of teeth, and the internally toothed gear 2 has the number of teeth 2n (n being a positive integer) larger than that.

For example, the wave generator 5 is linked with a high-speed rotation input shaft such as a motor shaft (not shown), the internally toothed gear 2 is fixed not to rotate, and the internally toothed gear 3 is linked with an output shaft (not shown). When the wave generator 5 rotates, the meshing positions between the internally toothed gear 2 and the externally toothed gear 4 moves in the circumferential direction to generate a relative rotation (a reduces-speed rotation) of the externally toothed gear 4 in accordance with the difference in the number of teeth between the gears 2 and 4. The other internally toothed gear 3 rotates integrally with the externally toothed gear 4 and outputs the reduced-speed rotation therefrom.

Figure 2:
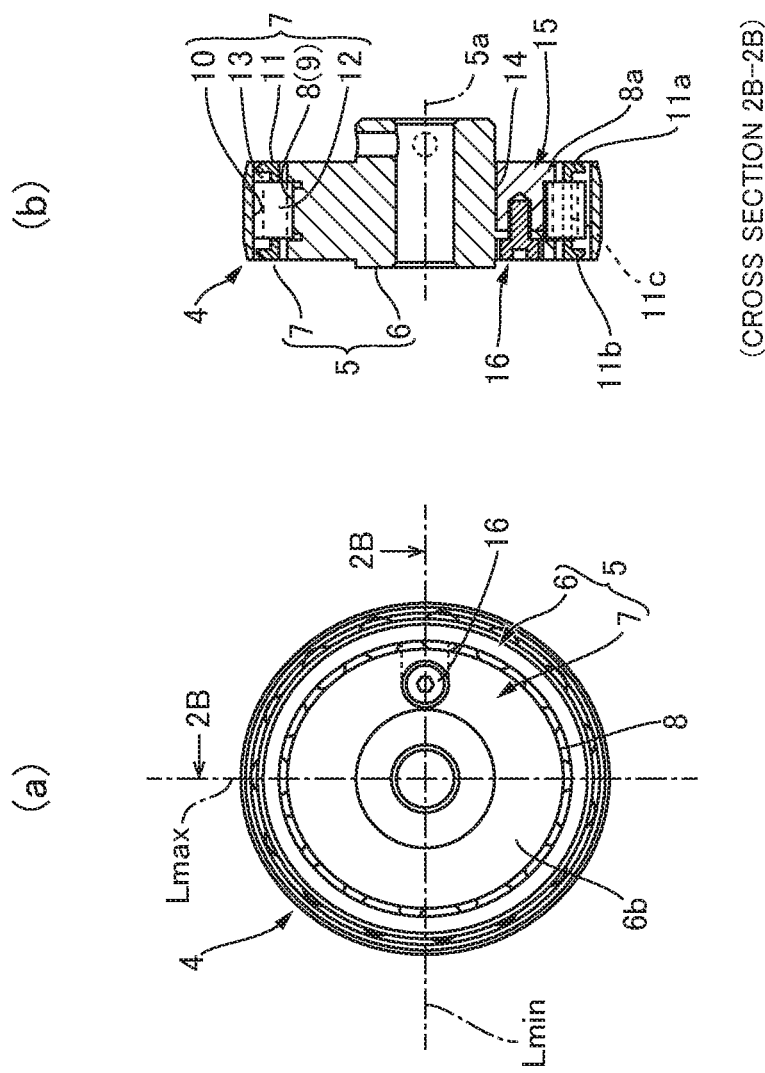
FIG. 2 includes a schematic front view and a schematic longitudinal cross-sectional view, illustrating a wave generator of FIG. 1.

FIG. 2(a) is a schematic front view illustrating the wave generator 5, and FIG. 2(b) is a schematic longitudinal cross-sectional view illustrating a portion cut along line 2B-2B of FIG. 2(a). The wave generator 5 is provided with a rigid wave plug 6 having an ellipsoidal contour and a wave bearing 7. The wave bearing 7 is a roller bearing and is provided with an ellipsoidal inner-race-side raceway surface 9 formed on an ellipsoidal outer circumferential surface 8 of the wave plug 6 that is made of steel or stainless steel, an outer-race-side raceway surface 10 formed on an inner circumferential surface of the externally toothed gear 4 that is made of steel or stainless steel, an annular retainer 11, and a plurality of cylindrical hollow rollers 12. The hollow rollers 12 are made of steel or stainless steel. The retainer 11 can be made of plastics or metal.

The ellipsoidal outer circumferential surface 8 of the wave plug 6 is formed with a flange 8a protruding radially and outward from the inner-race-side raceway surface 9, the flange being on both ends of the inner-race-side raceway surface 9 having a given width (the both ends in the direction of the center axis line 5a of the wave generator 5). The retainer 11 is disposed in a roller raceway 13 formed between the inner-race-side raceway surface 9 and the outer-race-side raceway surface 10. The retainer 11 is provided with annular flanges 11a and 11b formed on both ends in the width direction (the direction of the center axis line 5a), and a plurality of partition walls 11c bridged between the flanges 11a and 11b at given intervals in the circumferential direction. Pockets are respectively formed between the adjacent partition walls 11c for holding each hollow roller 12 in a manner being free to rotate, and the hollow rollers 12 are inserted into the pockets, respectively.

A roller insertion hole 14 is formed in the wave plug 6 for inserting the hollow rollers 12 into the roller raceway 13. A sealing plug 15 is inserted into the roller insertion hole 14 to seal the same. The sealing plug 15 is fastened to fix to the wave plug 6 by a fastening bolt 16. The roller insertion hole 14 is formed on one ellipsoidal end face 6b of the wave plug 6 to position at the minor axis Lmin thereof.

FIG. 3(a) is an end view of the hollow roller 12 and FIG. 3(b) is a longitudinal cross-sectional view thereof. FIG. 3(c) is an explanatory view illustrating a flexing state of the hollow roller 12 at respective positions in the circumferential direction of the wave bearing 7.

The hollow roller 12 has a large hollow part 12a. Where the outer diameter of the hollow roller 12 is Do, and the inner diameter of the hollow part 12a thereof is Di, the lower limit value of the ratio of the inner diameter Di to the outer diameter Do is set to be 0.95.

$$Di/Do \geq 0.95$$

When the hollow rollers 12 are made to reduce in thickness and to increase in hollow diameter, a group of hollow rollers 12, which are located at the both end portions in the major-axis direction of the ellipsoidal shape, become a tight state in which they are deformed into an ellipsoidal shape due to a radial load caused by a load torque of the strain wave gearing 1, as shown in FIG. 3(c).

Because of the flexure deformation of the hollow roller 12 to which the radial load is applied, it is possible to increase the relative radius of curvature between the hollow roller 12, and the inner-race-side raceway surface 9 and the outer-race-side raceway surface 10. In this way, the Hertz maximum contact stress can be reduced. By reduction in Hertz stress, there is no need to increase the hardness of the hollow rollers 12, the inner-race-side raceway surface 9 and the outer-race-side raceway surface 10. It is also possible to enhance the fatigue life of the hollow rollers 12 by making use of the hoop stress that is generated by flexing the hollow rollers 12.

Figure 4:
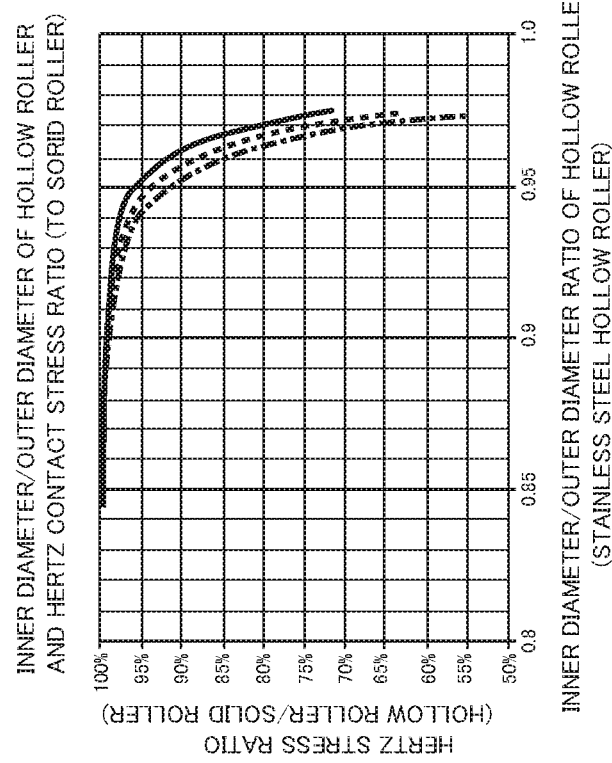
FIG. 4 is a graph illustrating a relationship of Hertz contact stress ratio between a hollow roller and a solid roller.
Figure 4:
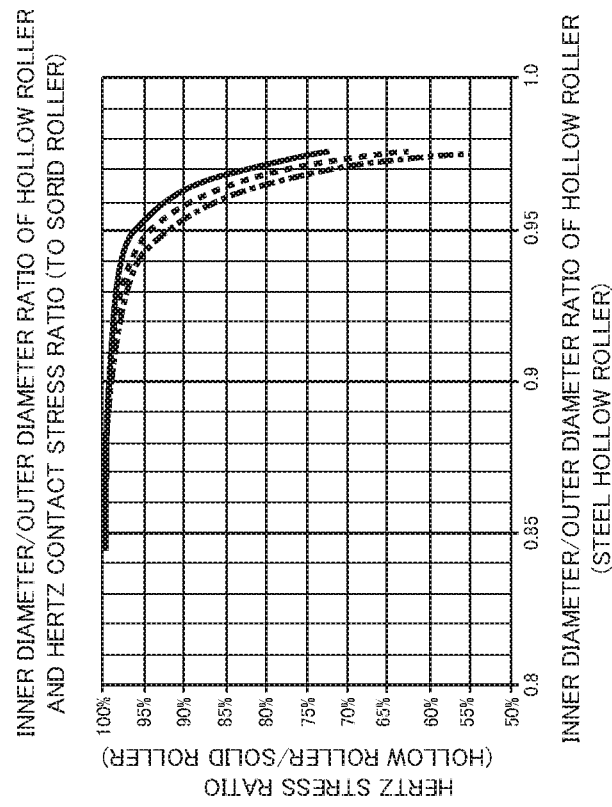

The present inventor et al measured the change in the ratio of Hertz stress acting on the hollow roller 12 and that acting on a solid roller having the same shape when the ratio of the inner diameter Di to the outer diameter Do of the hollow roller 12 is changed. FIG. 4(*a*) is a graph illustrating relationships in a case in which the hollow roller 12, the inner-race-side raceway surface 9 and the outer-race-side raceway surface 10 of the wave bearing 7 are made of steel. Curve shown by solid line is a relationship curve obtained when a prescribed load torque is applied, that shown by dotted line is a relationship curve obtained when a load torque 1.5 times the prescribed load torque is applied, and that shown by dash-dotted line is a relationship curve obtained when a load torque that is twice the prescribed load torque is applied.

As can be seen from these relationship curves, when the ratio of the inner diameter to the outer diameter (Di/Do) of the hollow roller 12 becomes to be equal to or larger than 0.95, the Hertz stress ratio is equal to or lower than about 95%. The rate of decrease in the ratio is greatly increased in a region where the inner diameter/outer diameter ratio is larger than 0.95. Therefore, the Hertz stress can be greatly reduced when the hollow roller 12 is made to be thin and have a large hollow diameter so that the inner diameter/outer diameter ratio is equal to or larger than 0.95, in comparison with a case in which a solid roller is used as the rolling element.

FIG. 4(*b*) illustrates relationships between the inner diameter/outer diameter ratio and the Hertz stress ratio in a case in which only the hollow roller 12 is made of stainless steel and the inner-race-side raceway surface 9 and the outer-race-side raceway surface 10 are still made of steel. In this case, the Hertz stress ratio becomes somewhat smaller than a case in which a hollow roller made of steel is used. However, as can be seen from the respective relationship curves of FIG. 4(*b*), similar relationships are obtained as those shown in FIG. 4(*a*) (in which a steel hollow roller and a steel solid roller are used.).

The Hertz stress can be greatly reduced by using the hollow roller 12 made of steel or stainless steel. Accordingly, it is possible for the wave plug formed with the inner-race-side raceway surface 9 and the externally toothed gear 4 formed with the outer-race-side raceway surface 10 to be manufactured from a material, such as plastics, having an elastic modulus lower than the material for the hollow roller 12 (which is steel or stainless steel).

Next, the upper limit value of the ratio Di/Do of the hollow roller 12 is limited by the following factors. First, the rigidity of the hollow roller in the diameter direction is determined so that the circular flexible externally toothed gear 4 is flexed by the wave plug 6 into an ellipsoidal shape having a predetermined major axis to mesh with the internally toothed gears 2 and 3 in an appropriate state. In other words, in order to obtain such rigidity, the thickness of the hollow roller 12 is determined. The upper limit value of the ratio Di/Do of the hollow roller 12 is limited by this thickness.

In addition, the upper limit value of the ratio Di/Do is limited so that the radius of curvature of the outer circumferential surface at the minor axis position of the ellipsoidally-flexed hollow roller 12 does not exceed the radius of curvature at the major axis position of the ellipsoidally-flexed inner-race-side raceway surface 9.

Figure 3:
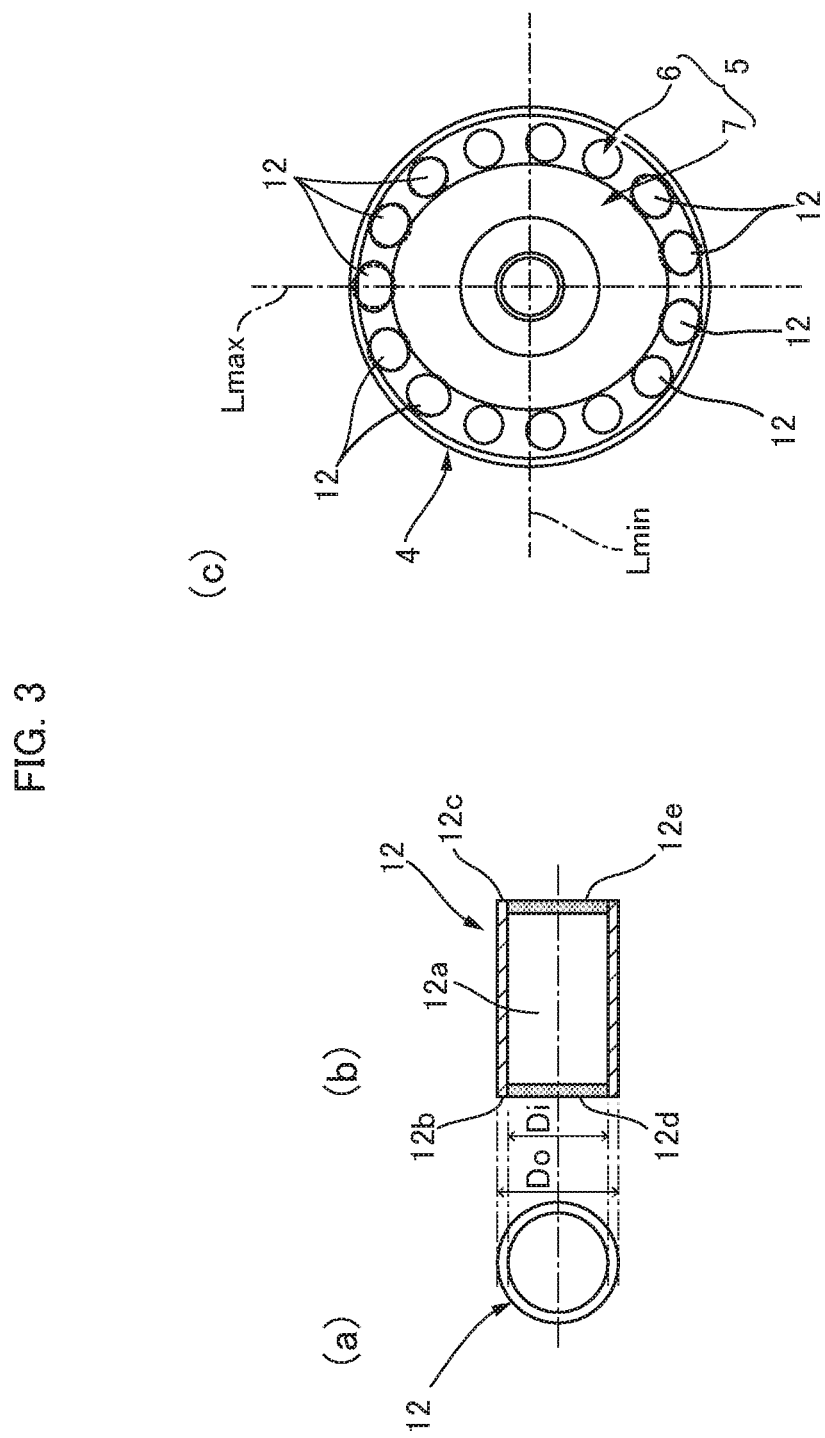
FIG. 3 includes an end view illustrating a hollow roller, a longitudinal cross-sectional view thereof, and an explanatory view illustrating a flexing state thereof.

Since the hollow roller 12 has a thin cylindrical shape as illustrated in FIG. 3(*b*), the areas of both end faces 12*b* and 12*c* thereof are small, and therefore there is a possibility that the function as the roller end face cannot be fulfilled in practice. In this example, the openings opened at both ends of the hollow roller 12 are sealed by roller end face parts 12*d* and 12*e*. The roller end face parts 12*d* and 12*e* are made of a material such as plastics having a lower elastic modulus and a lower coefficient of friction than a material of the hollow roller 12. The outside end faces of the roller end face parts 12*d* and 12*e* come in contact with the retainer 11 to restrict the position of the hollow roller 12 in the axial direction.

(Another Embodiments)

In the above embodiment, the inner race is integrally formed in the wave plug and the outer race is integrally formed in the externally toothed gear. It goes without saying that either one of the inner race and the outer race, or both of the inner and outer races can be arranged as a separate member.

In addition, the above embodiment relates to a strain wave gearing referred to as a flat type having a cylindrical externally toothed gear. The present invention can also be applied in a similar manner to a strain wave gearing referred to as a cup-type having a cup-shaped externally toothed gear and that referred to as a top-hat-type having a top-hat-shaped externally toothed gear.

The invention claimed is:

1. A wave generator of a strain wave gearing, the wave generator comprising:
   a rigid wave plug; and
   a wave bearing between an ellipsoidal outer circumferential surface of the wave plug and an inner circumferential surface of a flexible externally toothed gear, the flexible externally toothed gear being a component part of the strain wave gearing,
   wherein the wave bearing includes a plurality of rolling elements in a rollable state between an inner-race-side raceway surface and an outer-race-side raceway surface thereof;
   the rolling elements are a cylindrical hollow roller made of steel or stainless steel;
   a rigidity of the hollow roller in a diameter direction is set so as to establish a state in which the flexible externally toothed gear having a circular shape is flexed into a predetermined ellipsoidal shape by the rigid plug; and
   a lower limit value of a ratio Di/Do of an inner diameter Di to an outer diameter Do of the hollow roller is 0.95.

2. The wave generator of the strain wave gearing according to claim 1,
   wherein, on both ends in a direction of a major axis of the ellipsoidal outer circumferential surface of the wave plug, the hollow roller positioned within a prescribed angular range including the major axis is flexed into an ellipsoidal shape by the inner-race-side raceway surface and the outer-race-side raceway surface, and
   an upper limit value of the ratio Di/Do is set so that a radius of curvature of an outer circumferential surface at a minor axis position of the hollow roller that is flexed into an ellipsoidal shape does not exceed a radius of curvature at a major axis position of the inner-race-side raceway surface that is flexed into an ellipsoidal shape.

3. The wave generator of the strain wave gearing according to claim 1, further comprising:
   roller end face parts to seal at least openings on both sides of a hollow part of the hollow roller, and
   the roller end face parts are made of a material having a lower elastic modulus and a lower coefficient of friction than a material for the hollow roller.

4. A strain wave gearing, comprising:
   a rigid internally toothed gear;
   a flexible externally toothed gear disposed coaxially inside of the internally toothed gear; and
   a wave generator as set forth in claim 1.

5. The strain wave gearing according to claim 4,
wherein, on both ends in a direction of a major axis of the ellipsoidal outer circumferential surface of the wave plug, the hollow roller positioned within a prescribed angular range including the major axis is flexed into an ellipsoidal shape by the inner-race-side raceway surface and the outer-race-side raceway surface, and an upper limit value of the ratio $D_i/D_o$ is set so that a radius of curvature of an outer circumferential surface at a minor axis position of the hollow roller that is flexed into an ellipsoidal shape does not exceed a radius of curvature at a major axis position of the inner-race-side raceway surface that is flexed into an ellipsoidal shape.

6. The strain wave gearing according to claim 4, further comprising:

roller end face parts to seal at least openings on both sides of a hollow part of the hollow roller, wherein the roller end face parts are made of a material having a lower elastic modulus and a lower coefficient of friction than a material for the hollow roller.

* * * * *